US012403392B2

(12) United States Patent
Szymanik et al.

(10) Patent No.: US 12,403,392 B2
(45) Date of Patent: Sep. 2, 2025

(54) METHODS AND SYSTEMS FOR RESOURCE MANAGEMENT (71) Applicant: Comcast Cable Communications, LLC, Philadelphia, PA (US)

(72) Inventors: Colleen Szymanik, Philadelphia, PA (US); Mary Malone, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 17/325,776

(22) Filed: May 20, 2021

(65) Prior Publication Data

US 2022/0370902 A1 Nov. 24, 2022

(51) Int. Cl.
*A63F 13/35* (2014.01)
*A63F 13/323* (2014.01)
*A63F 13/77* (2014.01)
*A63F 13/355* (2014.01)

(52) U.S. Cl.
CPC ............ *A63F 13/35* (2014.09); *A63F 13/323* (2014.09); *A63F 13/77* (2014.09); *A63F 13/355* (2014.09)

(58) Field of Classification Search
CPC ........ A63F 13/35; A63F 13/355; A63F 13/77; A63F 13/323

USPC .......................................................... 463/42
See application file for complete search history.

(56) References Cited

U.S. PATENT DOCUMENTS

| 10,896,073 | B1* | 1/2021 | Jain ..................... G06F 11/3495 |
| 10,994,198 | B1* | 5/2021 | Byskal ..................... G06F 9/50 |
| 2007/0274327 | A1* | 11/2007 | Kaarela ................. H04L 67/104 370/401 |
| 2007/0286100 | A1* | 12/2007 | Saaranen ............ H04L 67/1068 370/260 |
| 2014/0228108 | A1* | 8/2014 | Bruno, Jr. ............. H04L 67/131 463/29 |
| 2020/0092232 | A1* | 3/2020 | Tojima .................... H04L 51/02 |
| 2021/0299557 | A1* | 9/2021 | Pare .................... G06F 9/45558 |
| 2022/0156776 | A1* | 5/2022 | Long ................. G06Q 30/0215 |
| 2022/0245989 | A1* | 8/2022 | Huke .................... G07F 17/323 |

* cited by examiner

*Primary Examiner* — Michael A Cuff
(74) *Attorney, Agent, or Firm* — Ballard Spahr LLP (57) ABSTRACT

Methods, systems, and apparatus are described herein for managing computing resources and computing tasks. A computing capability associated with a computing device can be compared to capability requirement associated with a computing task. In the case that a computing capability associated with a first computing device does not satisfy the capability requirement, an alternate computing device can be designated to execute the computing task.

20 Claims, 5 Drawing Sheets

METHODS AND SYSTEMS FOR RESOURCE MANAGEMENT

BACKGROUND

Computing applications such as online games and video conferences carry with them network requirements and computing capability requirements. If a user device using the application cannot satisfy these network requirements and computing capability requirements, aspects of the game or video conference may not be fully enabled. Typical approaches to this problem include throttling bandwidth or simply disabling a particular feature. These approaches detract from the user experience.

SUMMARY

It is to be understood that both the following general description and the following detailed description is merely an example and is explanatory only and is not restrictive. Methods, systems, and apparatuses for managing computing resources are described. In the course of participating in an application such as an online game or a video conference, it may be determined that a first computing device does not satisfy a capability requirement associated with a computing task involved in the application. It may be determined that a second computing device does satisfy the capability requirement associated with the computing task. These determinations may be made based on initialization of the application or at any time during use. As such, the computing device which satisfies the capability requirement may be designated as an alternate computing device responsible for executing the computing task and may execute the computing task.

BRIEF DESCRIPTION OF THE DRAWINGS

The accompanying drawings, which are incorporated in and constitute a part of this specification, illustrate embodiments and together with the description, serve to explain the principles.

DETAILED DESCRIPTION

Before the present techniques are disclosed and described, it is to be understood that this disclosure is not limited to specific methods, specific components, or to particular implementations. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" or "example" means "an example of" and is not intended to convey an indication of a preferred or ideal embodiment. "Such as" is not used in a restrictive sense, but for explanatory purposes.

Disclosed are components that can be used to perform the disclosed content analysis and storage techniques. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present systems and methods may be understood more readily by reference to the following detailed description of preferred embodiments and the examples included therein and to the Figures and their previous and following description.

As will be appreciated by one skilled in the art, the content analysis and storage techniques may take the form of an entirely hardware embodiment, an entirely software embodiment, or an embodiment combining software and hardware aspects. Furthermore, the content analysis and storage techniques may take the form of a computer program product on a computer-readable storage medium having computer-readable program instructions (e.g., computer software) embodied in the storage medium. More particularly, the present content analysis and storage techniques may take the form of web-implemented computer software. Any suitable computer-readable storage medium may be utilized including hard disks, CD-ROMs, optical storage devices, or magnetic storage devices.

Embodiments are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Figure 1:
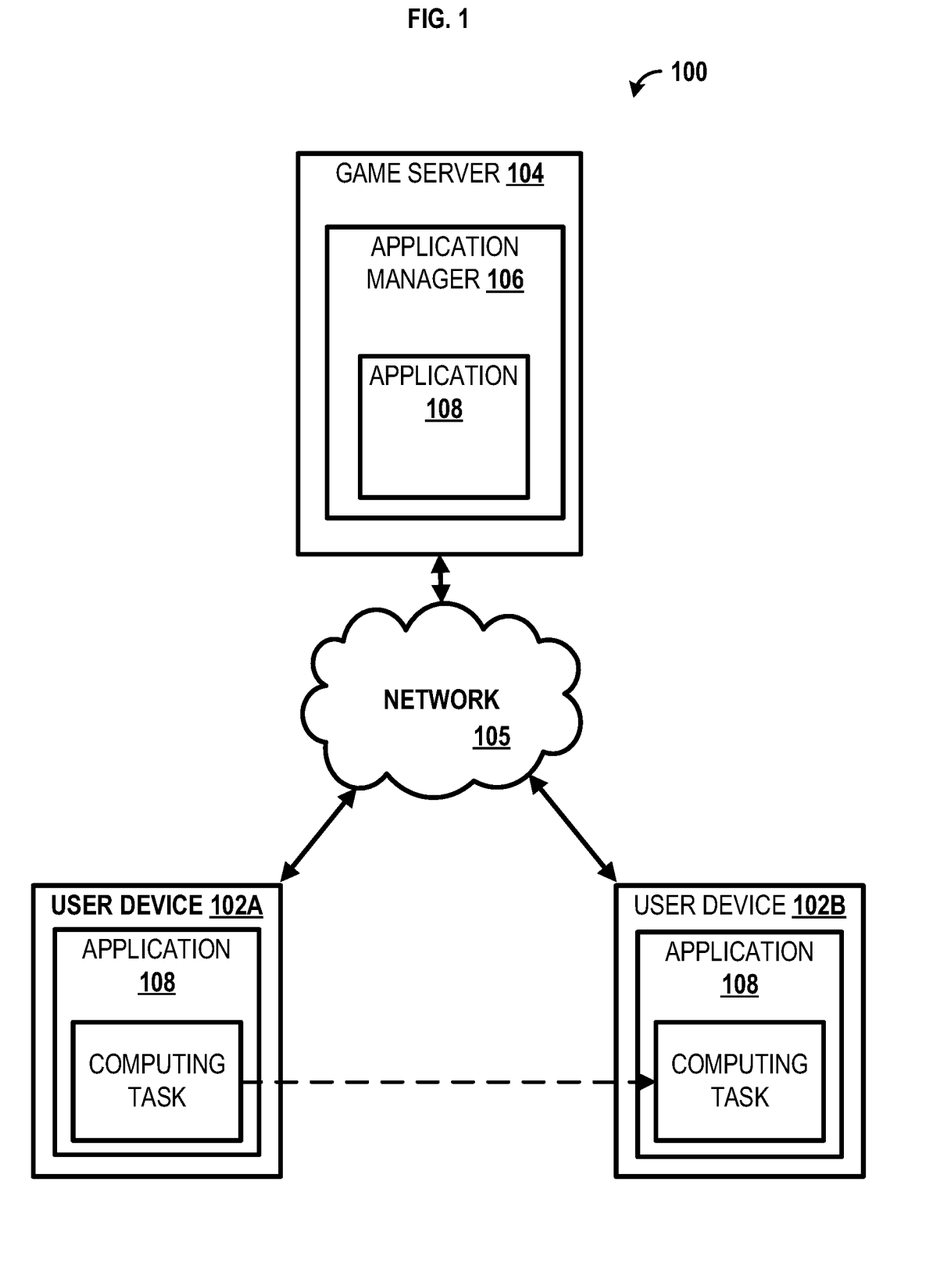
FIG. 1 is a block diagram of an example system and network.

FIG. 1 shows an example system 100 in which the present methods and systems may operate. One skilled in the art will appreciate that provided herein is a functional description and that the respective functions can be performed by software, hardware, or a combination of software and hardware. The system 100 may facilitate content distribution and computing resource management. The content may comprise any media such as a video game, an online game, an e-sports game, an online video conference, combinations thereof, and the like. The content may be associated with an application 108.

The system 100 may comprise a plurality of user devices 102A-B in communication with a computing device, such as a game server 104, through a network 105. For example, each user device of the plurality of user devices 102A-B may be a computing device such as a computer, gaming console, smart phone, camera, server, or any other device capable of generating or outputting data (e.g., the content). While only user devices 102A and 102B are shown, it is to be understood the system 100 may comprise any number of user devices. Likewise, while only a single game server 104 is shown, it is to be understood that the system 100 may comprise any number of game servers. The plurality of user devices 102A-B may be in communication with the game server 104 through a network 105. The network 105 may comprise any telecommunications network such as the Internet or a local area network. Other forms of communications can be used such as wired or wireless telecommunication channels, for example. The network 105 may be an optical fiber network, a coaxial cable network, a hybrid fiber-coaxial network, a wireless network, a satellite system, a direct broadcast system, an Ethernet network, a high-definition multimedia interface network, a Universal Serial Bus (USB) network, or any combination thereof.

Each user device of the plurality of user devices 102A-B may send and receive data to and from each other and the game server 104 through the network 105. Each user device of the plurality of user devices 102A-B may be associated with capability information (e.g., a capability profile or performance profile). The capability information may indicate performance parameters associated with the user device. For example, the capability information may indicate one or more capabilities associated with the respective user device. For example, the one or more capabilities may comprise network capabilities, graphics processing capabilities, resource availability, network connection status, response time, processing speed, channel capacity, latency, bandwidth, throughput, relative efficiency, scalability, power consumption, compression ratios, size and weight, environmental impact, transistor counts, signal quality, combinations thereof, and the like. For example, a first user device 102A of the plurality of user devices 102A-B may be associated with a network connection speed of 60 kbps (kilobytes per second), high network latency, and a low signal to noise ratio (SNR) while a second user device 102B of the plurality of user devices 102A-B is associated with a network connection speed of 120 kpbs, low network latency, and a high SNR. For example, the first user device 102A of the plurality of user devices 102A-B, may be associated with a graphics processing capability of 60 Hz framerate while the second user device 102B of the plurality of user devices 102A-B may be associated with a graphics processing capability of 120 Hz. Similarly, the first user device 102A may be associated with a processing speed of 60 KiloFLOPS (floating point operations per second) while the second user device 102B is associated with a processing speed of 120 KiloFLOPS. Each user device of the plurality of user deices 102A-B may send and receive data to and from the game server 104.

The game server 104 may be any computing device which may receive, process, distribute, and/or output data. The game server 104 may comprise an application manager 106 configured to run the application 108. For example, the application 108 may comprise a game such as a video game. For example, the one or more computing tasks may comprise receiving or sending data, processing commands or instructions, rendering graphics and/or executing game actions such as wielding a weapon, moving an avatar, or any other game action. The application manager 106 may be configured to manage the one or more computing tasks. For example, the application manager 106 may be configured to designate a machine (e.g., a user device of the plurality of user devices 102A-B) to execute a computing task of the one or more computing tasks. For example, graphics rendering typically involves generating images and/or video. For example, video games generally involve real-time graphics rendering to generate video as a video game is played. The generated video may reflect, for example, video game objects and scenery as a player interacts with a video game environment, as well as player actions, actions of multiple other players in a multi-player game, and/or other actions or events that may occur in the video game environment. For example, a multiplayer video game application may render graphics at a central computing device (e.g., the game server 104), and may stream real-time rendered video content from the central computing device hosting the video game application to the plurality of user devices 102A-B operated by players of the video game.

Each user device of the plurality of user devices 102A-B may be configured to run the application 108. The application 108 may be associated with the one or more computing tasks. The one or more computing tasks may comprise, for example, one or more of: rendering graphics, performing one or more gaming tasks, executing a command, sending or receiving data (including sharing audio and/or visual data between the plurality of user devices 102A-B), performing a computation, or performing data analysis, combinations thereof, and the like. The one or more gaming tasks, may comprise, for example, one or more of: wielding a weapon, executing a game action, activating a game ability, or moving a game object, combinations thereof, and the like. The one or more computing tasks may be associated with one or more capability requirements. For example, a first computing task of the one or more computing tasks may be associated with a capability requirement which requires a bandwidth of 120 kbps and a processing speed of 120 KiloFLOPS. For example, the first computing task of the one or more computing tasks may require a first upload speed and a first download speed (e.g., receiving bitrate and sending bitrate). For example, the first computing task of the one or more computing tasks may require a minimum latency, a mean opinion score (MOS), a minimum quality of service, a minimum quality of experience, combinations thereof, and the like.

When a user device of the plurality of user devices 102A-B launches the application 108 (or at any other time during use), the user device may send to the game server 104, the capability profile associated with that user device. For example, the user device 102A may launch the application 108 and may send, to the game server 104, the capability profile associated with the first user device 102A. The application manager may determine the capability information at any time at which any user device of the plurality of user devices 102A-B are running the application 108. For example, one or more user devices of the plurality of user devices 102A-B may run one or more diagnostic tests and report the results to the application manager. For example, the application manager 106 may be configured to run one or more diagnostic tests to determine network conditions.

The capability profile associated with the first user device 102A may indicate the first user device 102A is associated with a network connection speed of 60 kbps (kilobytes per second), high latency, and a low signal to noise ratio (SNR). The capability profile associated with the second user device 102B may indicate the second user device 102B of the plurality of user devices 102A-B is associated with a network connection speed of 120 kpbs, low latency, and a high SNR. The capability profile associated with the first user device 102A may indicate the first user device 102A is capable of a processing speed of only 60 KiloFLOPS and a framerate of only 60 Hz. Similarly, the second user device 102B may launch the application 108 and may send, to the game server 104, the capability profile associated with the second user device 102B. The capability profile associated with the second user device may indicate the second user device 102B is capable of a processing speed of 120 KiloFLOPS and a framerate of 120 Hz.

The game server 104 may receive the capability profiles (e.g., the capability profile associated with the first user device 102A and the capability profile associated with the second user device 102B). The application manager may compare the capability profiles of the plurality of user devices 102A-B to the capability requirements of the application 108 and/or the capability requirements associated with the one or more computing tasks.

The game server 104 may receive the data (e.g., capability information, game actions) from each user device of the plurality of user devices 102A-B. The game server 104 may be configured to process the data. For example, during the course of game play, a user may enter a command (e.g., by pressing a button on a controller) which may cause a character to perform a game action. Data associated with the game action may be sent from the first user device 102A to the game server 104. The game server 104 may process the data. For example, the game server 104 may cause graphics to be rendered on a user device of the plurality of user devices 102A-B. For example, the game server 104 may relay the game action to the other user device 102B.

The game action may comprise one or more of wielding and/or exchanging a game object, executing and/or exchanging a power-up, executing and/or exchanging a broadcast of video data and/or audio data. The game object may be, for example at least one of: a weapon (e.g., a sword, a hammer, a gun, a slingshot, rocket launcher, a spear, a bow and arrow, a saw, a bomb, a grenade, a bore), a vehicle (e.g., a car, a truck, a plane, a bus, a jeep, a truck, a spaceship, a boat, a submarine, a helicopter, a drone), or any other object featured in a game (e.g., a flag, an animal, a game token). A person skilled in the art will appreciate that the aforementioned are merely exemplary and explanatory and are not limiting. The game action may be, for example, a power-up and/or exchanging the power-up. The game action may comprise a broadcast of video data and/or audio data.

Examples of an exchange of a game object may include, but are not limited to, transferring a virtual machine gun from a first player associated with the first user device 102A to a second player associated with the second user device 102B, transferring a flag from the first player associated with the first user device 102A to the second player associated with the second user device 102B, transferring a virtual sword from the first player associated with the first user device 102A to the second player associated with the second user device 102B. For example, the game action may comprise carrying a flag in a virtual game of capture the flag. In operation, the application 108 may comprise the virtual game of capture the flag. Based on an initialization of the application 108, and/or at any time during running of the application 108, the game server 104 may determine the capability profile associated with each user device of the plurality of user device 102A-B. The game server 104 may determine a graphics rendering requirement associated with capturing and carrying the flag and returning to a player's "base" with the flag. For example, the flag may be made to flash and flutter while a special effect is applied a character presently carrying the flag. The game server 104 may determine that the first user device 102A of the plurality of user devices 102A-B is associated with the character presently carrying the flag. The game server 104 may determine the capability profile associate with the first user device 102A that indicates the first user device 102A does not possess sufficient graphics processing power to appropriately render the character and flag. The game server 104 may determine a capability profile associated with a second user device 102B of the plurality of user devices 102A-B. The capability profile associated with the second user device 102B may indicate the second user device 102B possesses sufficient graphics processing power to appropriately render the flag. The game server 104 may designate the second user device 102B to execute the game action of carrying the flag and may thus "transfer" the flag to a second character, wherein the second character is associated with the second user device 102B. The game server 104 may send one or more messages to the first computing device 102A and the second computing device 102B. For example, the game server may send a message to the first user device 102A indicating the first user device 102A does not possess sufficient graphics processing power and thus, the game server 104 is transferring the game action (e.g., carrying the flag) to the second user device 102B. For example, the one or more message may comprise a selectable option soliciting input from the first user device 102A (e.g., via a user interface). Selecting the selectable option may cause the game server 104 to send a second message to the second user device 102B. For example, the second message may indicate to a user of the second user device 102B that the flag is being transferred to the second character.

For example, the game action may comprise driving a vehicle in a virtual racing game. In operation, the application 108 may comprise the virtual racing game. Based on an initialization of the application 108, and/or at any time during running of the application 108, the game server 104 may determine the capability profile associated with each user device of the plurality of user device 102A-B. The game server 104 may determine a graphics rendering requirement associated with driving the vehicle in the virtual racing game. For example, the vehicle may have color-changing paint or some other feature requiring processing power. The game server 104 may determine that the first user device 102A of the plurality of user devices 102A-B is associated with a character presently driving the vehicle. The game server 104 may determine the capability profile associate with the first user device 102A that indicates the first user device 102A does not possess sufficient graphics processing power to appropriately render the vehicle. The game server 104 may determine a capability profile associated with a second user device 102B of the plurality of user devices 102A-B. The capability profile associated with the second user device 102B may indicate the second user device 102B possesses sufficient graphics processing power to appropriately render the vehicle. The game server 104 may designate the second user device 102B to execute the game action of driving the vehicle and thus may "transfer" the vehicle to a second character, wherein the second character is associated with the second user device 102B. The game server 104 may send one or more messages to the first computing device 102A and the second computing device 102B. For example, the game server may send a message to the first user device 102A indicating the first user device 102A does not possess sufficient graphics processing power and thus, the game server 104 is transferring the game action (e.g., driving the vehicle) to the second user device 102B. For example, the one or more message may comprise a selectable option soliciting input from the first user device 102A (e.g., via a user interface). Selecting the selectable option may cause the game server 104 to send a second message to the second user device 102B. For example, the second message may indicate to a user of the second user device 102B that the vehicle is being transferred to the second character.

Examples of an exchange of a power-up may include, but are not limited to, activating an ability such as increased running speed, enhanced armor, increased fire rate of a weapon, combinations thereof, and the like. For example, the power up may comprise an ability (e.g., the character can run faster), an enhancement (e.g., an increased fire rate of a weapon, new and shiny armor), an accessory (e.g., control of a remote drone), combinations thereof, and the like. For example, the character may encounter a token and, by virtue of encountering the token, acquire the ability to run faster. However, as the character moves quickly through a game environment, the game environment must be rendered at an appropriate speed. The game server 104 may determine a user device (e.g., the first user device 102A) associated with the character with the enhanced ability does not possess the graphics processing capacity required to appropriately render the increased speed with which the character will move through the gaming environment. The game server 104 may determine the second user device 102B possesses the graphics processing capacity to render the increased speed with which the character will move through the gaming environment(e.g., the increased speed with which the gaming environment must be rendered to match the increased speed of the character). The game server 104 may designate the second user device 102B to execute the game action (e.g., the power up) and thus transfer the power up to a second character associated with the second user device 102B. The power up may be exchanged between players upon the determination that a first user device 102A does not possess the processing power and/or has too much network latency to carry out the power up.

For example, the game action may comprise enabling night vision. In operation, the application 108 may comprise a first person shooter. Based on an initialization of the application 108, and/or at any time during running of the application 108, the game server 104 may determine the capability profile associated with each user device of the plurality of user device 102A-B. The game server 104 may determine a graphics rendering requirement associated with the night vision (e.g., different color scales or speeds). The game server 104 may determine that the first user device 102A of the plurality of user devices 102A-B is associated with a character who just unlocked the night vision power-up. The game server 104 may determine the capability profile associate with the first user device 102A that indicates the first user device 102A does not possess sufficient processing power to appropriately render the night vision. The game server 104 may determine a capability profile associated with a second user device 102B of the plurality of user devices 102A-B. The capability profile associated with the second user device 102B may indicate the second user device 102B possesses sufficient graphics processing power to appropriately render the night vision. The game server 104 may designate the second user device 102B to execute the game action of enabling night vision and may thus "transfer" the night vision ability to a second character, wherein the second character is associated with the second user device 102B. The game server 104 may send one or more messages to the first computing device 102A and the second computing device 102B. For example, the game server may send a message to the first user device 102A indicating the first user device 102A does not possess sufficient graphics processing power and thus, the game server 104 is transferring the game action (e.g., using night vision) to the second user device 102B. For example, the one or more message may comprise a selectable option soliciting input from the first user device 102A (e.g., via a user interface). Selecting the selectable option may cause the game server 104 to send a second message to the second user device 102B. For example, the second message may indicate to a user of the second user device 102B that the flag is being transferred to the second character.

Examples of a broadcast may include, but are not limited to, sending and/or receiving video data and/or audio data associated with gameplay. The broadcast may comprise a first user device 102A "sharing" data with one or more other computing devices of the plurality of user devices 102A-B. For example, the first user device 102A may be designated to share one or more of audio data and/or video data with other user devices running the application 108 (e.g., other user devices participating in the game). For example, the first user device may broadcast video and audio data associated with game play of the first user device 102A (e.g., screenshare) to the other user devices such that the other user devices may be caused to display the video and audio data associated with the game play of the first user device 102A. The game server 104 may determine that a network connection associated with the first user device 102A (e.g., a local area network) is experiencing high latency and thus, the first user device 102A is unable to broadcast the video and audio data associated with the game play of the first user device 102A with sufficient quality. The game server 104 may determine that the second user device 102B is associated with a network connection that has low latency and thus may facilitate broadcast of video and audio data associated with game play of the second user device 102B. Accordingly, the game server 104 may designate the second user device 102B to execute the game action (e.g., the game server 104 may designate the second user device 102B to broadcast the video and audio data associated with game play of the second user device 102B to the other devices.

The application manager 106 may determine a user device (e.g., the user device 102A) of the plurality of user devices 102A-B does not possess sufficient resources to execute the computing task. For example, the application manager 106 may determine, based on receipt of the capability profile, that the user device 102A does not have the capability to execute a particular task. For example, the application manager 106 may determine that the user device 102A is not capable of executing the first computing task which requires a network speed of 120 kpbs and a processing speed of 120 KiloFLOPS. The application manager 106 may determine that the second user device 102B is capable of executing the first computing task which requires the bandwidth of 120 kpbs and the processing speed of 120 KiloFLOPS. Likewise, the application manager 106 may determine, at any time (e.g., during game play) the user device 102A is not capable of executing the computing task. For example, the application manager 106 may query, at routine intervals, each user device of the plurality of user devices 102A-B and, in response to the query, each user device of the plurality of user devices 102A-B may send, to the application manager 106, the capability information. In a similar vein, each user device of the plurality of user devices 102A-B may be configured to periodically run one or more diagnostic tests in order to determine the capability information. For example, the first computing device 102A may run a first diagnostic test. A result of the first diagnostic test may indicate the first user device 102A is experiencing a network latency of 90 milliseconds. The first user device 102A may send the result of the first diagnostic test to the application manager 106. The application manager 106 may determine that 90 milliseconds of latency is sufficient for the first user device 102A to execute a computing task while achieving a user experience quality level. For example, the user experience quality level may be a determination that the network latency is not impacting game play. The first user device 102A may perform a second diagnostic test. A result of the second diagnostic test may indicate the first user device 102A is now experiencing network latency of 900 milliseconds. The first user device 102A may send the result of the second diagnostic test to the application manager 106. The application manager 106 may determine that 900 milliseconds of network latency is insufficient to execute the computing task while achieving the user experience quality level (e.g., the network latency is now impacting gameplay for the first user device 102A). For example, the second computing device 102B may run a third diagnostic test. A result of the third diagnostic test may indicate the second user device 102B is experiencing a network latency of 10 milliseconds. The second user device 102B may send the result of the third diagnostic test to the application manager 106. The application manager 106 may determine that 10 milliseconds of latency is sufficient for the second user device 102A to execute the computing task while achieving the user experience quality level. The application manager 106 may designate the second computing device 102B to execute the computing task that the first user device 102A is incapable of executing. In the context of an online game, the application manager 106 may determine that the second user device 102B is associated with a user who is on the same team as a user associated with the first user device 102A and thus, may designate the second computing device 102B to execute the computing task that the first user device 102A is incapable of executing. The application manager 106 and/or the game server 104 may send a message to the first user device 102A. The message may comprise a notification indicating that the first user device 102A is not capable of executing the first computing task. For example, the message may comprise an on-screen alert which notifies a first user associated with the first user device 102A that the first user device 102A is not capable of executing the first computing task. The message may identify an alternate user device which is capable of executing the first computing task. For example, the message may identify the second user device 102B as the alternate user device which is capable of executing the first computing task. The message may comprise a selectable option.

The user device 102A may be configured to receive a user input via, for example, a user interface. For example, the user device 102A may be configured to receive a selection of the selectable option via the user interface. For example, a user selecting the selectable option may confirm the designation of the alternate user device. The user device 102A may receive a user input selecting the selectable option identifying the second user device 102B as the alternate user device designated to execute the first computing task.

Selecting the selectable option may cause a message to be sent from the user device 102A to the game server 104. The message may cause the application manager to designate the second user device 102B as the alternate user device designated to execute the first computing task. The application manager 106 may cause the second user device 102B to execute the first computing task.

Figure 2:
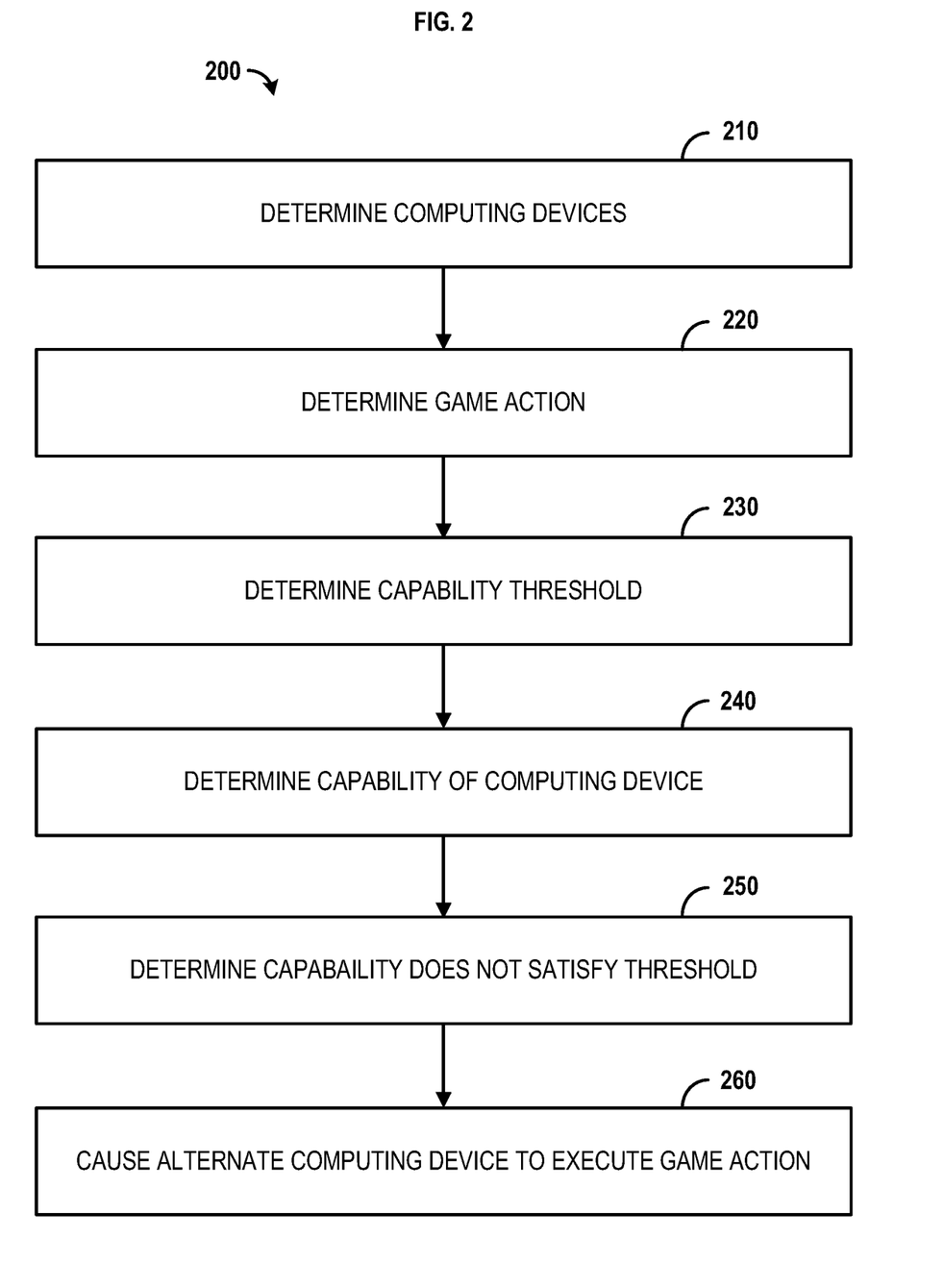
FIG. 2 is a flowchart of an example method.

FIG. 2 shows an example method 200, executing on one or more of the devices of FIG. 1. At step 210, a plurality of computing devices participating in a game may be determined. The plurality of computing devices may comprise the plurality of user devices 102A-B. For example, each computing device of the plurality of computing devices may be a gaming console, a mobile phone, laptop computer, desktop computer, combinations thereof, and the like. The plurality of computing devices may be configured to participate in a computing session such as a gaming session (e.g., a "game" such as an online video game) and/or a videoconference. The game may comprise any game such, for example, an e-sports game, a massive multiplayer online game (MMOG), a role-playing game (RPG), a first person shooter (FPS), a strategy game, a sports game, a puzzle game, combinations thereof, and the like. The aforementioned examples are merely exemplary and explanatory and are not intended to be limiting and a person skilled in the art will appreciate that the game may be any game.

At step 220, a game action associated with a computing device of the plurality of computing devices may be determined. The game action may be associated with a computing device of the plurality of computing devices (e.g., the computing task may be associated with a user device of the plurality of user devices 102A-B). The game action may comprise, for example, wielding a weapon, a power-up (e.g., activating a game ability), moving a game object, combinations thereof, and the like. For example, the weapon may comprise a virtual flaming sword in the game. For example, the weapon may comprise a virtual machine gun in the game. Rendering the flaming sword or the virtual machine gun may be associated with a capability requirement such as a graphics processing requirement and/or network requirement. For example, correctly rendering the virtual flaming sword may require a framerate of 60 Hz. For example, correctly rendering the virtual machine gun (and the associated flash upon firing), may require a framerate of 120 Hz. For example, the capability requirement may comprise a bandwidth such as 120 kbps.

At step 230, a capability threshold for executing the game action may be determined. The capability threshold may be associated with one or more capabilities. The capability threshold may comprise the resource requirement. For example, the capability threshold may comprise a graphics processing requirement. For example, correctly rendering the virtual flaming sword may require a framerate of 60 Hz. For example, correctly rendering the virtual machine gun (and the associated flash upon firing), may require a framerate of 120 Hz. The game may be associated with one or more capabilities. As such, the game action may be associated with a capability of the one or more capabilities. The computing task may comprise wielding a weapon, executing a game action, activating a game ability, or moving a game object, combinations thereof, and the like. The capability threshold may comprise one or more network capabilities, graphics processing capabilities, resource availability, network connection status, response time, processing speed, channel capacity, latency, bandwidth, throughput, relative efficiency, scalability, power consumption, compression ratios, size and weight, environmental impact, transistor counts, signal quality, combinations thereof, and the like.

At 240, a capability of the computing device may be determined. The capability may be associated with one or more of network capabilities, graphics processing capabilities, resource availability, network connection status, response time, processing speed, channel capacity, latency, bandwidth, throughput, relative efficiency, scalability, power consumption, compression ratios, size and weight, environmental impact, transistor counts, signal quality, combinations thereof, and the like. Determining the capability may comprise receiving, from each computing device of the plurality of computing devices, information such as network capabilities, graphics processing capabilities, memory capacity, other processing capacity, combinations thereof, and the like. The capability may be determined based on initiation of an application (e.g., a video game), and/or at any time while the application is running. For example, a computing device such as the game server 104 may determine, for each of the plurality of user devices 102A-B, a graphics processing capacity. For example, the first user device 102A may be associated with a first network capability. For example, the first user device 102A of the plurality of user devices 102A-B may be associated with a network connection speed of 60 kbps and a low signal to noise ratio (SNR) while a second user device 102B of the plurality of user devices 102A-B is associated with a network connection speed of 120 kpbs and a high SNR. Similarly, the first user device 102A may be associated with a first graphics processing capacity. For example, the second user device 102B may be associated with a second graphics processing capacity. Each of the first graphics processing capacity and the second graphics processing capacity may be associated with a graphic processing unit (GPU). The GPU may be associated with, for example, a GPU clock speed, a memory, and a random-access memory digital-to-analog converter (RAMDAC speed). GPU memory may comprise an amount of available memory (MB), a clock rate (MHz), a bandwidth (GB/s), combinations thereof, and the like. RAMDAC speed impacts the image quality, how often the screen can be refreshed per second, and the maximum resolution you can display. For example, the first graphics processing capacity may be associated with a first graphics processing unit and the second graphics processing capacity may be associated with a second graphics processing unit. That is to say, the first user device 102A may comprise the first GPU and the second user device 102B may comprise the second GPU. Each of the first and second GPUs may comprise an electronic circuit designed to rapidly manipulate and alter memory to accelerate the creation of images in a frame buffer intended for output to a display device, as is known in the art. Determining the one or more capabilities associated with each computing device of the plurality of computing devices may comprise receiving the capability information from each computing device of the plurality of computing devices. For example, based on initiation of an application, each computing device of the plurality of computing devices may send the capability information to, for example, the game server 104. For example, the application may comprise a gaming application. In a similar manner, the game server 104 may query each computing device of the one or more computing devices.

At 250, it may be determined that the capability of the computing devices does not satisfy the capability threshold. Determining that the capability of the computing device does not exceed the capability threshold may be based on the game action. For example, based on initiation of the application, or at time while the application is running, it may be determined that the first user device 102A is associated with a bandwidth of 60 kbps. Thus the capability threshold for the computing task that requires a bandwidth of 120 kbps is not satisfied by the capability of the first user device 102A with a bandwidth of 60 kbps.

For example, during game play, a game avatar associated with the first user device 102A may acquire the virtual machine gun which rendering at a frame rate of 120 Hz. The game server 104 may determine that that the first user device 102A has a GPU which is only capable of rendering graphics at a frame rate of 60 Hz. Thus, the capability threshold of 60 Hz associated with the GPU of the first user device 102A is exceed by the capability requirement of 120 Hz associated with the virtual machine gun.

At 260, an alternate computing device (e.g., an alternate user device) may be caused to execute the game action. For example, the alternate computing device may be caused to execute the game action because the capability requirement of the computing task exceeds the capability threshold of the first user device 102A. For example, it may be determined that the second user device 102B is associated with a bandwidth of 120 kpbs and thus the second user device 102B satisfies the capability requirement of the computing task. Similarly, it may be determined, for example, by the game server, that the second user device 102B is associated with a graphics processing capability of 240 Hz. Therefore, the game server 104, for example, may designate the second user device 102B as the alternate computing device and cause the alternate computing device to execute the game action. In the video game context, the alternate computing device may be associated with a user who is on the same team as a user associated with the computing device. For example, both users (e.g., the user associated with the first user device 102A and the user associated with the second user device 102B) may be on the "red team" in Call of Duty®.

The method may further comprise presenting an option. For example, the game server 104 may send a first message to the first user 102A. The first message may cause the first user device 102A to display a notification notifying a user of the first user device 102A that a capability requirement associated with a computing task executing on (or about to be executed on) the first user device 102A exceeds the capability threshold of the first user device 102A. The notification may comprise a selectable option. The selectable option may identify the alternate computing device (e.g., the second user device 102B) as a computing device which is capable of executing the computing task. The first user device 102A may receive a user input indicating that the user has designated the second user device 102B to execute the computing task.

Figure 3:
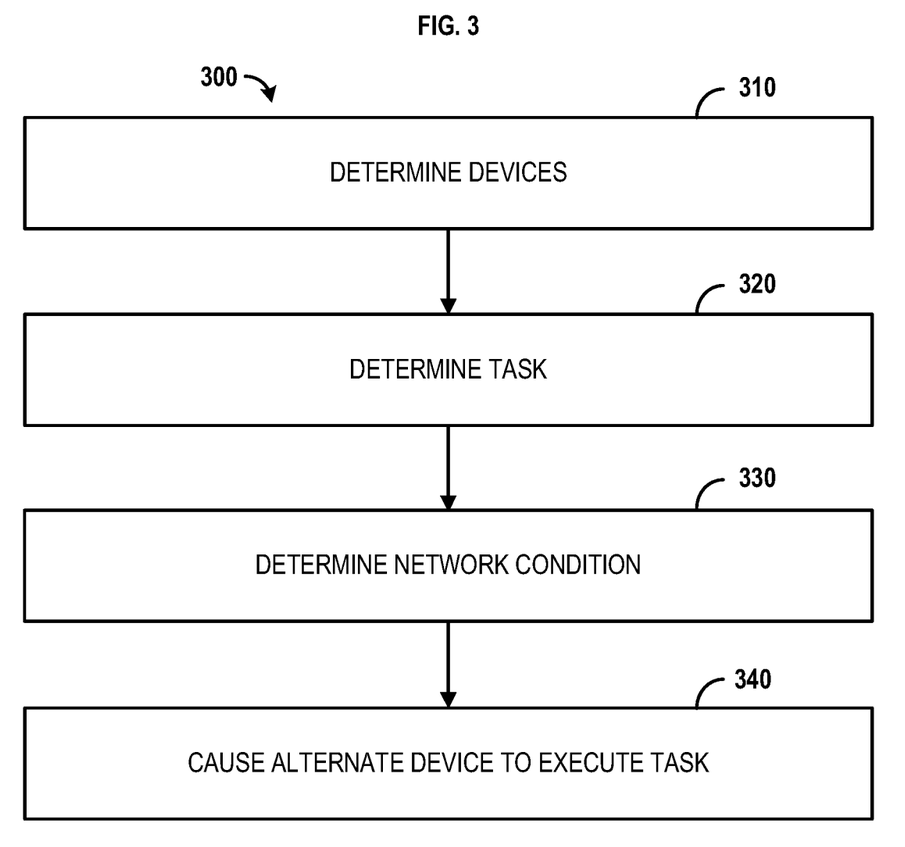
FIG. 3 is a flowchart of an example method.

FIG. 3 shows an example method 300, executing on one or more of the devices of FIG. 1. At step 310, a plurality of computing devices may be determined. For example, the plurality of computing devices may comprise one or more gaming consoles (e.g., the plurality of user devices 102A-B) participating in a gaming session (e.g., an online video game). Each of the plurality of computing devices may be associated with one or more capabilities and/or capability thresholds. For example, the first user device 102A may be associated with bandwidth of 60 kpbs. For example, the first user device 102A may be associated with a first graphics processing capacity. For example, the second user device 102B may be associated with a second graphics processing capacity. Each of the first graphics processing capacity and the second graphics processing capacity may be associated with a graphic processing unit (GPU). The GPU may be associated with, for example, a GPU clock speed, a memory, and a random-access memory digital-to-analog converter (RAMDAC speed). GPU memory may comprise an amount of available memory (MB), a clock rate (MHz), a bandwidth (GB/s), combinations thereof, and the like. RAMDAC speed impacts the image quality, how often the screen can be refreshed per second, and the maximum resolution you can display. For example, the first graphics processing capacity may be associated with a first graphics processing unit and the second graphics processing capacity may be associated with a second graphics processing unit. That is to say, the first user device 102A may comprise the first GPU and the second user device 102B may comprise the second GPU. Each of the first and second GPUs may comprise an electronic circuit designed to rapidly manipulate and alter memory to accelerate the creation of images in a frame buffer intended for output to a display device, as is known in the art. Determining the one or more capabilities associated with each computing device of the plurality of computing devices may comprise receiving the capability information from each computing device of the plurality of computing devices. For example, based on initiation of an application, each computing device of the plurality of computing devices may send the capability information to, for example, the game server 104. For example, the application may comprise a gaming application. In a similar manner, the game server 104 may query each computing device of the one or more computing devices.

At step 320, a computing task associated with a computing device of the plurality of computing devices may be determined. For example, the computing task may be associated with a computing device of the plurality of computing devices. The computing task may comprise, for example, executing a game action. Executing a game action may comprise, for example, wielding a weapon. For example, the weapon may comprise a virtual flaming sword in the game. For example, the weapon may comprise a virtual machine gun in the game. The computing task may be associated with a resource requirement. For example, the resource requirement may comprise a graphics processing requirement. For example, correctly rendering the virtual flaming sword may require a framerate of 60 Hz. For example, correctly rendering the virtual machine gun (and the associated flash upon firing), may require a framerate of 120 Hz. The computing task may be associated with one or more capabilities. As such, the computing task may be associated with a capability of the one or more capabilities. The computing task may comprise wielding a weapon, executing a game action, activating a game ability, or moving a game object, combinations thereof, and the like.

At step 330, a network condition may be determined. The network condition may comprise a change in bandwidth associated with a computing device of the plurality of computing devices. For example, the network condition may be associated with the computing task. For example, the network condition may comprise a download speed, an upload speed, a bandwidth, an interference level, a signal quality level, a signal-to-noise ratio, combinations thereof, and the like. The network condition may be associated with a computing device of the plurality of computing devices. It may be determined that the network condition fails to satisfy a network condition threshold. For example, the network condition may comprise a connection status. For example, the network condition threshold may comprise a "connected" status. For example, it may be determined that the first user device 102A is no longer connected to the network 105 and therefore no longer in communication with either of the game server 104 and/or the second user device 102B. Similarly, the network condition may comprise a bandwidth or other condition.

At step 340, an alternate computing device (e.g., the second user device 102B) may be caused to execute the computing task. For example, the alternate computing device may be caused to execute the computing task because the network condition associated with the first user device 102A (e.g., the "not connected" status) may fail to satisfy the network condition threshold (e.g., the "connected" status). However, it may be determined, for example, by the game server, that the second user device 102B is presently connected to the network. Therefore, the game server 104, for example, may cause the second user device 102B to be the alternate computing device designated for executing the computing task.

The method may further comprise presenting an option. For example, the game server 104 may send a first message to the first user 102A. The first message may cause the first user device 102A to display a notification notifying a user of the first user device 102A that a capability requirement associated with the computing task executing on (or about to be executed on) the first user device 102A exceeds the capability threshold of the first user device 102A. The notification may comprise a selectable option. The selectable option may identify the alternate computing device (e.g., the second user device 102B) as a computing device which is capable of executing the computing task. The first user device 102A may receive a user input indicating that the user has designated the second computing device 102B to execute the computing task. Based on receiving the user input, the first user device 102A may send a message to the game server 104. The message may cause the game server 104 to designate the second user device 102B as the alternate computing device and thus cause the second user device 102B to execute the computing task.

Figure 4:
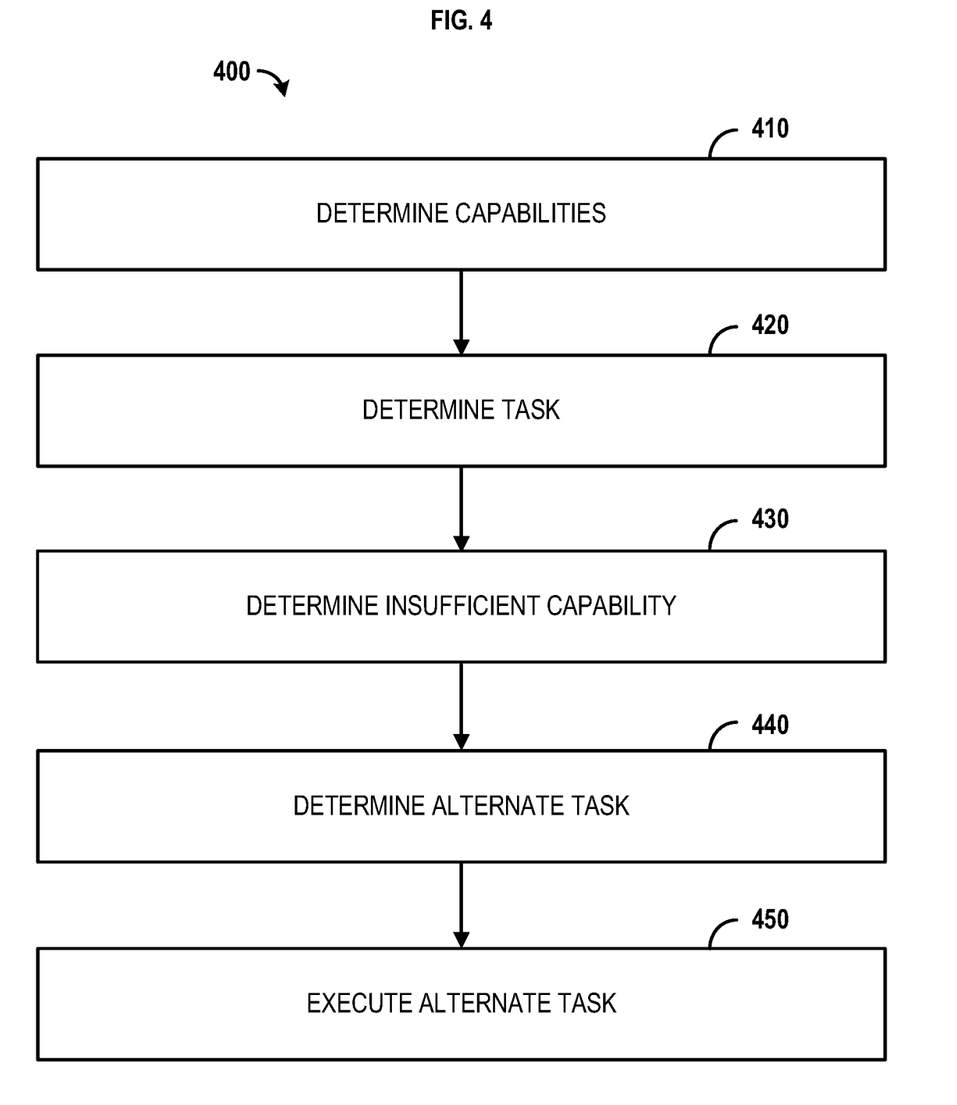
FIG. 4 is a flowchart of an example method.

FIG. 4 shows an example method 400, executing on one or more of the devices of FIG. 1. At step 410, one or more capabilities associated with one or more computing devices participating in a game may be determined. For example, the first user device 102A may be associated with a first bandwidth. For example, the first user device 102A may be associated with a first graphics processing capacity. For example, the second user device 102B may be associated with a second bandwidth. The second bandwidth may be greater than the first bandwidth. For example, the second user device 102B may be associated with a second graphics processing capacity. The second graphics processing capacity may be greater than the first graphic processing capacity. Each of the first graphics processing capacity and the second graphics processing capacity may be associated with a graphics processing unit (GPU). The GPU may be associated with, for example, a GPU clock speed, a memory, and a random-access memory digital-to-analog converter (RAMDAC speed). GPU memory may comprise an amount of available memory (MB), a clock rate (MHz), a bandwidth (GB/s), combinations thereof, and the like. RAMDAC speed impacts the image quality, how often the screen can be refreshed per second, and the maximum resolution you can display. For example, the first graphics processing capacity may be associated with a first graphics processing unit and the second graphics processing capacity may be associated with a second graphics processing unit. That is to say, the first user device 102A may comprise the first GPU and the second user device 102B may comprise the second GPU. Each of the first and second GPUs may comprise an electronic circuit designed to rapidly manipulate and alter memory to accelerate the creation of images in a frame buffer intended for output to a display device, as is known in the art. Determining the one or more capabilities associated with each computing device of the plurality of computing devices may comprise receiving the capability information from each computing device of the plurality of computing devices. For example, based on initiation of an application, each computing device of the plurality of computing devices may send the capability information to, for example, the game server 104. For example, the application may comprise a gaming application. In a similar manner, the game server 104 may query each computing device of the one or more computing devices.

At step 420, a computing task associated with a computing device of the plurality of computing devices may be determined. For example, the computing task may be associated with a user device of the plurality of user devices 102A-B. The computing task may comprise, for example, executing a game action. Executing the game action may comprise, for example, wielding a weapon. For example, the weapon may comprise a virtual flaming sword in the game. For example, the weapon may comprise a virtual machine gun in the game. The computing task may be associated with a resource requirement. For example, the resource requirement may comprise a graphics processing requirement. For example, correctly rendering the virtual flaming sword may require a framerate of 60 Hz. For example, correctly rendering the virtual machine gun (and the associated flash upon firing), may require a framerate of 120 Hz. The computing task may be associated with one or more capabilities. As such, the computing task may be associated with a capability of the one or more capabilities. The computing task may comprise wielding a weapon, executing a game action, activating a game ability, or moving a game object, combinations thereof, and the like.

At step 430, it may be determined that a capability of the one or more capabilities is insufficient to execute the computing task. For example, it may be determined that the first computing device is associated with GPU with a framerate of 60 Hz, however, the first computing device 102A is also, due to the actions in the game, associated with a computing task that requires a 120 Hz framerate. Thus, the capability of the first user device 102A is insufficient to execute the computing task.

At step 440, an alternate computing task may be determined. For example, the alternate computing task may be determined based on the insufficient capability and the computing task. For example, the alternate computing task may comprise a computing task associated with a lowered processing requirement. For example, if the computing task comprises wielding the virtual machine gun which requires a 120 Hz framerate, the alternate computing task may comprise wielding the virtual flaming sword which requires only a 60 Hz framerate.

At step 450, the computing device (e.g., the first user device 102A) may be caused to execute the alternate computing task in lieu of the computing task. For example, the first user device 102A may be caused to render an avatar wielding the virtual flaming sword rather than the virtual machine gun.

The method may further comprise presenting an option. For example, the game server 104 may send a first message to the first user 102A. The first message may cause the first user device 102A to display a notification notifying a user of the first user device 102A that a capability requirement associated with a computing task executing on (or about to be executed on) the first user device 102A exceeds the capability threshold of the first user device 102A. The notification may comprise a selectable option. The selectable option may identify the alternate computing device (e.g., the second user device 102B) as a computing device which is capable of executing the computing task. The first user device 102A may receive a user input indicating that a user has designated the second user device 102B to execute the computing task.

Figure 5:
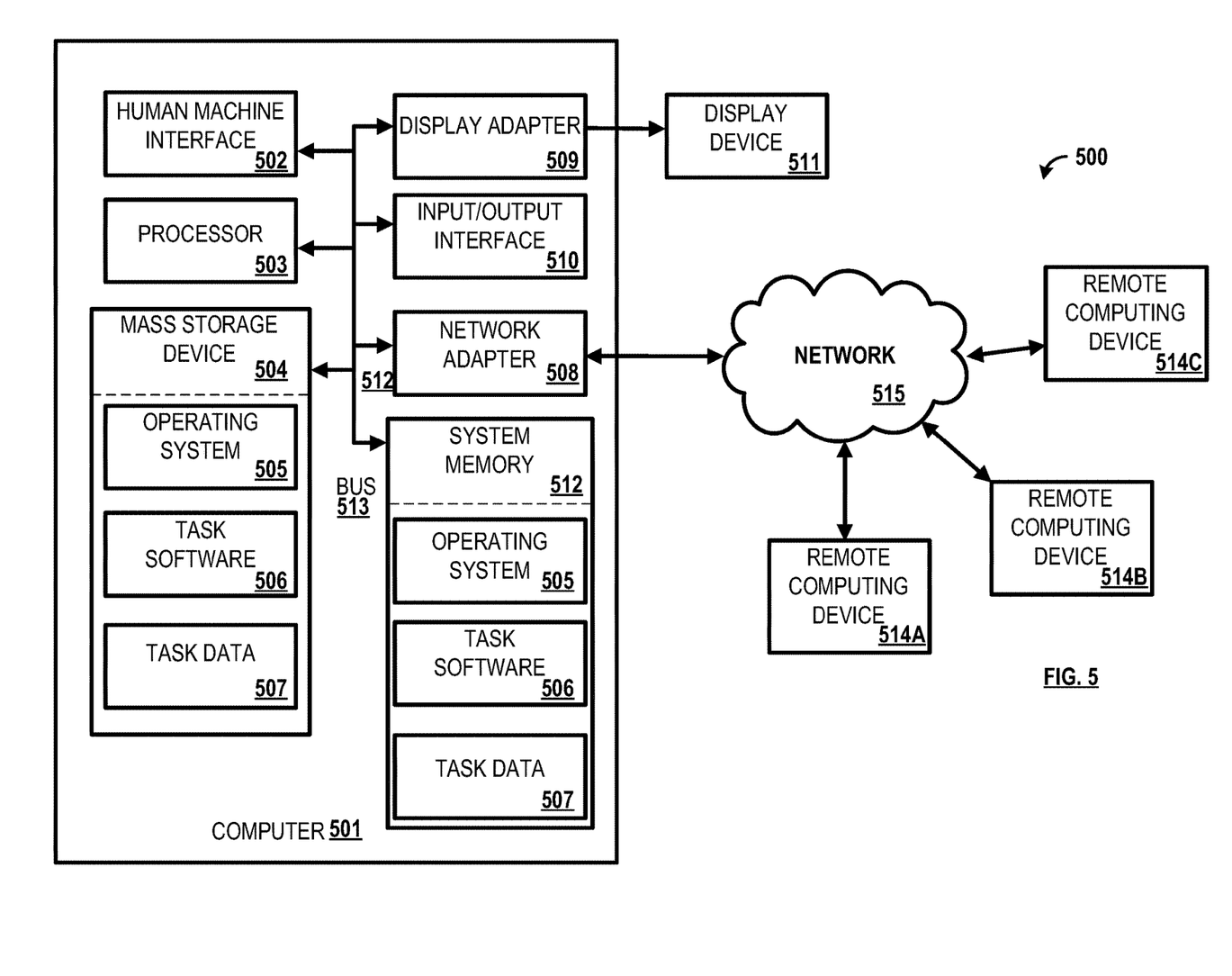
FIG. 5 is a block diagram of an example computing device.

The above described disclosure may be implemented on a computer 501 as illustrated in FIG. 5 and described below. By way of example, game server 104 of FIG. 1 can be a computer as illustrated in FIG. 5. Similarly, user device 102 may be a computer as illustrated in FIG. 5. Likewise, the game server 104 or the user device 102 may be a remote computing device (e.g., remote computing devices 514A, 514B, or 514C) of FIG. 5. FIG. 5 is a block diagram illustrating an example operating environment for performing the disclosed methods. This example operating environment is only an example of an operating environment and is not intended to suggest any limitation as to the scope of use or functionality of operating environment architecture. Neither should the operating environment be interpreted as having any dependency or requirement relating to any one or combination of components illustrated in the example operating environment.

The present disclosure can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, and multiprocessor systems. Examples comprise set top boxes, programmable consumer electronics, network PCs, minicomputers, mainframe computers, distributed computing environments that comprise any of the above systems or devices, and the like.

The processing of the disclosed can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 501. The components of the computer 501 can comprise, but are not limited to, one or more processors 503, a system memory 512, and a system bus 513 that couples various system components including the one or more processors 503 to the system memory 512. The system can utilize parallel computing.

The system bus 513 represents one or more of several possible types of bus structures, including a memory bus or memory controller, a peripheral bus, an accelerated graphics port, or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCM-CIA), Universal Serial Bus (USB) and the like. The bus 513, and all buses specified in this description can also be implemented over a wired or wireless network connection and each of the subsystems, including the one or more processors 503, a mass storage device 504, an operating system 505, computing task software 506, computing task data 507, a network adapter 508, the system memory 512, an Input/Output Interface 510, a display adapter 509, a display device 511, and a human machine interface 502, can be contained within one or more remote computing devices 514A, 514B, 514C at physically separate locations, connected through buses of this form, in effect implementing a fully distributed system.

The computer 501 typically comprises a variety of computer readable media. Example readable media can be any available media that is accessible by the computer 501 and comprises, for example and not meant to be limiting, both volatile and non-volatile media, removable and non-removable media. The system memory 512 comprises computer readable media in the form of volatile memory, such as random access memory (RAM), and/or non-volatile memory, such as read only memory (ROM). The system memory 512 typically contains data such as the computing task data 507 and/or program modules such as the operating system 505 and the computing task software 506 that are immediately accessible to and/or are presently operated on by the one or more processors 503.

The computer 501 can also comprise other removable/non-removable, volatile/non-volatile computer storage media. By way of example, FIG. 5 illustrates the mass storage device 504 which can facilitate non-volatile storage of computer code, computer readable instructions, data structures, program modules, and other data for the computer 501. For example and not meant to be limiting, the mass storage device 504 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 504, including by way of example, the operating system 505 and the computing task software 506. Each of the operating system 505 and the computing task software 506 (or some combination thereof) can comprise elements of the programming and the computing task software 506. The computing task data 507 can also be stored on the mass storage device 504. The computing task data 507 can be stored in any of one or more databases known in the art. Examples of such databases comprise, DB2®, Microsoft® Access, Microsoft® SQL Server, Oracle®, mySQL, PostgreSQL, Mongo, Cassandra, and the like. The databases can be centralized or distributed across multiple systems.

The user or device can enter commands and information into the computer 501 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the one or more processors 503 via the human machine interface 502 that is coupled to the system bus 513, but can be connected by other interface and bus structures, such as a parallel port, game port, an IEEE 1394 Port (also known as a Firewire port), a serial port, or a universal serial bus (USB).

The display device 511 can also be connected to the system bus 513 via an interface, such as the display adapter 509. It is contemplated that the computer 501 can have more than one display adapter 509 and the computer 501 can have more than one display device 511. For example, the display device 511 can be a monitor, an LCD (Liquid Crystal Display), an augmented reality (AR) display, a virtual reality (VR) display, a projector, combinations thereof, and the like. In addition to the display device 511, other output peripheral devices can comprise components such as speakers (not shown) and a printer (not shown) which can be connected to the computer 501 via the Input/Output Interface 510. Any step and/or result of the methods can be output in any form to an output device. Such output can be any form of visual representation, including, but not limited to, textual, graphical, animation, audio, tactile, and the like. The display device 511 and computer 501 can be part of one device, or separate devices.

The computer 501 can operate in a networked environment using logical connections to one or more remote computing devices 514A, 514B, 514C. By way of example, a remote computing device can be a gaming system, personal computer, portable computer, smartphone, a server, a router, a network computer, a peer device or other common network node, and so on. Logical connections between the computer 501 and a remote computing device 514A, 514B, 514C can be made via a network 515, such as a local area network (LAN) and/or a general wide area network (WAN). Such network connections can be through the network adapter 508. The network adapter 508 can be implemented in both wired and wireless environments. Such networking environments are conventional and commonplace in dwellings, offices, enterprise-wide computer networks, intranets, and the Internet.

For purposes of illustration, application programs and other executable program components such as the operating system 505 are illustrated herein as discrete blocks, although it is recognized that such programs and components reside at various times in different storage components of the computing device 501, and are executed by the one or more processors 503 of the computer. An implementation of the selective computing task software 506 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Example computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The disclosure can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the disclosure has been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as an example only, with a true scope and spirit being indicated by the following claims.

What is claimed is:

1. A method comprising:
   determining a plurality of computing devices participating in a game;
   receiving from a computing device of the plurality of computing devices participating in the game, one or more game commands;
   determining a capability threshold associated with executing the one or more game commands;
   determining that a capability of the computing device does not satisfy the capability threshold; and
   causing, based on the capability not satisfying the capability threshold, an alternate computing device of the plurality of computing devices to execute the one or more game commands.

2. The method of claim 1, wherein the capability of the computing device comprises at least one of: a network capability, graphics processing capability, a computing resource availability, a computing performance capability, a processing speed, a network connection status, a response time, a channel capacity, a latency, a bandwidth, a throughput, a relative efficiency, a scalability, a power consumption, a compression ratio, size and weight, an environmental impact, a transistor count, or a signal quality.

3. The method of claim 1, wherein the one or more game commands comprise one or more of wielding and/or exchanging a game object, executing and/or exchanging a power-up, executing and/or exchanging a broadcast of video data and/or audio data.

4. The method of claim 1, further comprising determining the alternate computing device based on at least one of: alternate device network capabilities, alternate device processing capabilities, or a computing rule set.

5. The method of claim 1, wherein causing the alternate computing device to execute the one or more game commands comprises determining that a first user associated with the computing device is on the same team as a second user associated with the alternate computing device.

6. The method of claim 1, further comprising:
   presenting, via the computing device, a message confirming a designation of the alternate computing device.

7. The method of claim 1, further comprising:
   determining an optimal computing device; and
   sending, to the computing device, a message, wherein the message comprises a recommendation that the optimal computing device be designated to execute a subsequent game command.

8. An apparatus, comprising:
   one or more processors; and
   memory storing processor executable instructions that, when executed by the one or more processors, cause the apparatus to:
      determine a plurality of computing devices participating in a game;
      receive from a computing device of the plurality of computing devices participating in the game, one or more game commands;
      determine a capability threshold associated with executing the one or more game commands;
      determine that a capability of the computing device does not satisfy the capability threshold; and
      cause, based on the capability not satisfying the capability threshold, an alternate computing device of the plurality of computing devices to execute the one or more game commands.

9. The apparatus of claim 8, wherein the capability of the computing device comprises at least one of: a network capability, graphics processing capability, a computing resource availability, a processing speed, a network connection status, a response time, a channel capacity, a latency, a bandwidth, a throughput, a relative efficiency, a scalability, a power consumption, a compression ratio, size and weight, an environmental impact, a transistor count, or a signal quality.

10. The apparatus of claim 8, wherein the one or more game commands comprise one or more of wielding and/or exchanging a game object, executing and/or exchanging a power-up, executing and/or exchanging a broadcast of video data and/or audio data.

11. The apparatus of claim 8, wherein the processor executable instructions, when executed by the one or more processors, further cause the apparatus to determine the alternate computing device based on at least one of: alternate device network capabilities, alternate device processing capabilities, or a computing rule set.

12. The apparatus of claim 8, wherein the processor executable instructions that, when executed by the one or more processors, cause the apparatus to cause the alternate computing device to execute the one or more game commands, further cause the alternate computing device to execute the one or more game commands by determining that a first user associated with the computing device is on the same team as a second user associated with the alternate computing device.

13. The apparatus of claim 8, wherein the processor executable instructions, when executed by the one or more processors, further cause the apparatus to:
   present, via the alternate computing device, a message confirming a designation of the alternate computing device.

14. The apparatus of claim 8, wherein the processor executable instructions, when executed by the one or more processors, further cause the apparatus to:
   determine an optimal computing device; and
   send, to the computing device, a message, wherein the message comprises a recommendation that the optimal computing device be designated to execute a subsequent game command.

15. A system comprising:
   a computing device configured to:
      determine a plurality of user devices participating in a game;
      receive, from a user device of the plurality of user devices participating in the game, one or more game commands;
      determine a capability threshold required for executing the one or more game commands;
      determine that a capability of the user device does not satisfy the capability threshold;
      cause, based on the capability not satisfying the capability threshold, an alternate user device of the plurality of user devices to execute the one or more game commands; and
   the alternate user device configured to:
      execute the one or more game commands.

16. The system of claim 15, wherein the capability of the computing device comprises at least one of: a network capability, graphics processing capability, a computing resource availability, a processing speed, a network connection status, a response time, a channel capacity, a latency, a bandwidth, a throughput, a relative efficiency, a scalability, a power consumption, a compression ratio, size and weight, an environmental impact, a transistor count, or a signal quality.

17. The system of claim 15, wherein the one or more game commands comprise one or more of wielding and/or exchanging a game object, executing and/or exchanging a power-up, executing and/or exchanging a broadcast of video data and/or audio data.

18. The system of claim 15, further comprising determining the alternate user device based on at least one of: alternate device network capabilities, alternate device processing capabilities, or a computing rule set.

19. The system of claim 15, wherein causing the alternate user device to execute the one or more game commands comprises determining that a first user associated with the user device is on the same team as a second user associated with the alternate user device.

20. The system of claim 15, wherein the computing device is further configured to send, to the user device, a message confirming a designation of the alternate user device.

* * * * *